US012506853B2

(12) United States Patent
Chapman et al.

(10) Patent No.: US 12,506,853 B2
(45) Date of Patent: Dec. 23, 2025

(54) SEE-THROUGH OPERATOR AWARENESS TOOL USING SYNTHESIZED VIEWPOINTS

(71) Applicant: Disney Enterprises, Inc., Burbank, CA (US)

(72) Inventors: Steven Chapman, Burbank, CA (US); Mark Arana, Burbank, CA (US); Michael Goslin, Burbank, CA (US); Joseph Popp, Burbank, CA (US); Mehul Patel, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 200 days.

(21) Appl. No.: 17/860,266

(22) Filed: Jul. 8, 2022

(65) Prior Publication Data

US 2022/0417489 A1 Dec. 29, 2022

Related U.S. Application Data

(63) Continuation of application No. 16/006,726, filed on Jun. 12, 2018, now Pat. No. 11,394,949.

(51) Int. Cl.
*H04N 23/54* (2023.01)
*H04N 13/204* (2018.01)

(52) U.S. Cl.
CPC .......... *H04N 13/204* (2018.05); *H04N 23/54* (2023.01)

(58) Field of Classification Search
CPC .... H04N 13/204; H04N 23/54; H04N 13/117; H04N 13/243; H04N 13/344; H04N 5/2628; H04N 5/272; G06F 3/012
See application file for complete search history.

(56) References Cited

U.S. PATENT DOCUMENTS

| 9,924,093 | B1 | 3/2018 | Leizerovich et al. |
| 10,403,043 | B2* | 9/2019 | Kaufman ................. G09B 9/00 |
| 10,805,600 | B2* | 10/2020 | Keesling .............. H04N 13/194 |
| 2009/0140881 | A1* | 6/2009 | Sakai ..................... G08G 1/164 340/901 |
| 2010/0201810 | A1* | 8/2010 | Shimazaki ................ B60R 1/00 348/135 |
| 2012/0113209 | A1 | 5/2012 | Ritchey et al. |
| 2013/0222371 | A1 | 8/2013 | Reitan |
| 2015/0205035 | A1 | 7/2015 | Border et al. |
| 2015/0258432 | A1 | 9/2015 | Stafford et al. |
| 2016/0124501 | A1 | 5/2016 | Lam et al. |

(Continued)

FOREIGN PATENT DOCUMENTS

| AU | 2017210289 B2 * | 10/2021 | ............... A61B 1/00 |
| WO | WO-2013155217 A1 * | 10/2013 | ........... G02B 27/017 |

*Primary Examiner* — Dramos Kalapodas
(74) *Attorney, Agent, or Firm* — Dorsey & Whitney LLP

(57) ABSTRACT

The disclosure is directed a method including capturing image data of a real-world environment at a first location and a second location different than the first location. The image data includes a plurality of intersecting image data points captured at both the first location and the second location, and a representation of an area occluded by an obstacle from a point of view of a user and; generating a synthesized field of view ("FOV") that includes the plurality of intersecting image data points such that the synthesized FOV includes an unobstructed view of the area occluded by the obstacle from the point of view of the user; and rendering the synthesized FOV as a visual display.

19 Claims, 9 Drawing Sheets

(56) References Cited

U.S. PATENT DOCUMENTS

| | | | |
|---|---|---|---|
| 2016/0379414 A1* | 12/2016 | Brown | F41G 3/142 |
| | | | 345/633 |
| 2017/0039765 A1* | 2/2017 | Zhou | G06T 7/521 |
| 2017/0113702 A1* | 4/2017 | Thieberger-Navon | |
| | | | B60W 50/0097 |
| 2017/0345311 A1* | 11/2017 | Sugiura | G06V 20/58 |
| 2019/0068850 A1 | 2/2019 | Peper, Jr. et al. | |
| 2019/0122425 A1* | 4/2019 | Sheffield | H04N 13/243 |
| 2019/0182415 A1* | 6/2019 | Sivan | G06F 3/013 |
| 2019/0311592 A1* | 10/2019 | Wulff | G08B 13/2414 |

\* cited by examiner

SEE-THROUGH OPERATOR AWARENESS TOOL USING SYNTHESIZED VIEWPOINTS

CROSS REFERENCE TO RELATED APPLICATIONS

This application claims the benefit of priority pursuant to 35 U.S.C. § 120 of U.S. patent application Ser. No. 16/006,726, filed Jun. 12, 2018, entitled "See-Through Operator Awareness Tool Using Synthesized Viewpoints," which is hereby incorporated by reference herein in its entirety.

BRIEF SUMMARY OF THE DISCLOSURE

The disclosure is directed to providing operator visibility through an object that occludes the view of the operator by using a head mounted display (HMD) system in communication with one or more imaging devices.

In one embodiment a method, includes: capturing image data of a real-world environment at a first location and a second location different than the first location, wherein the image data includes a plurality of intersecting image data points captured at both the first location and the second location, and a representation of an area occluded by an obstacle from a point of view of a user and; generating a synthesized field of view ("FOV") that includes the plurality of intersecting image data points such that the synthesized FOV includes an unobstructed view of the area occluded by the obstacle from the point of view of the user; and rendering the synthesized FOV as a visual display.

In one embodiment, a non-transitory computer-readable medium having executable instructions stored thereon that, when executed by a processor, cause the processor to: capture image data of a real-world environment at a first location and a second location different than the first location, wherein the image data includes a plurality of intersecting image data points captured at both the first location and the second location, and a representation of an area occluded by an obstacle from a point of view of a user and; generate a synthesized field of view ("FOV") that includes the plurality of intersecting image data points such that the synthesized FOV includes an unobstructed view of the area occluded by the obstacle from the point of view of the user; and render the synthesized FOV as a visual display.

In one embodiment, a visual display system, includes: a display; a processor in communication with the display and configured to: receive image data of a real-world environment captured at a first location and a second location different than the first location, wherein the image data includes a plurality of intersecting image data points captured at both the first location and the second location, and a representation of an area occluded by an obstacle from a point of view of a user; generate a synthesized field of view ("FOV") that includes the plurality of intersecting image data points such that the synthesized FOV includes an unobstructed view of the area occluded by the obstacle from the point of view of the user; and render the synthesized FOV on the display.

As used herein, the term "augmented reality" or "AR" generally refers to a view of a physical, real-world environment that is augmented or supplemented by computer-generated or digital information such as video, sound, and graphics. The digital information is directly registered in the user's physical, real-world environment such that the user may interact with the digital information in real time. The digital information may take the form of images, audio, haptic feedback, video, text, etc. For example, three-dimensional representations of digital objects may be overlaid over the user's view of the real-world environment in real time.

As used herein, the term "virtual reality" or "VR" generally refers to a simulation of a user's presence in an environment, real or imaginary, such that the user may interact with it.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIB. 3B conceptually illustrates a process of synthesizing a FOV of video captured by two cameras on opposite sides of a HMD with a FOV of a HMD that is partially obstructed by an obstacle.

Figure 4:
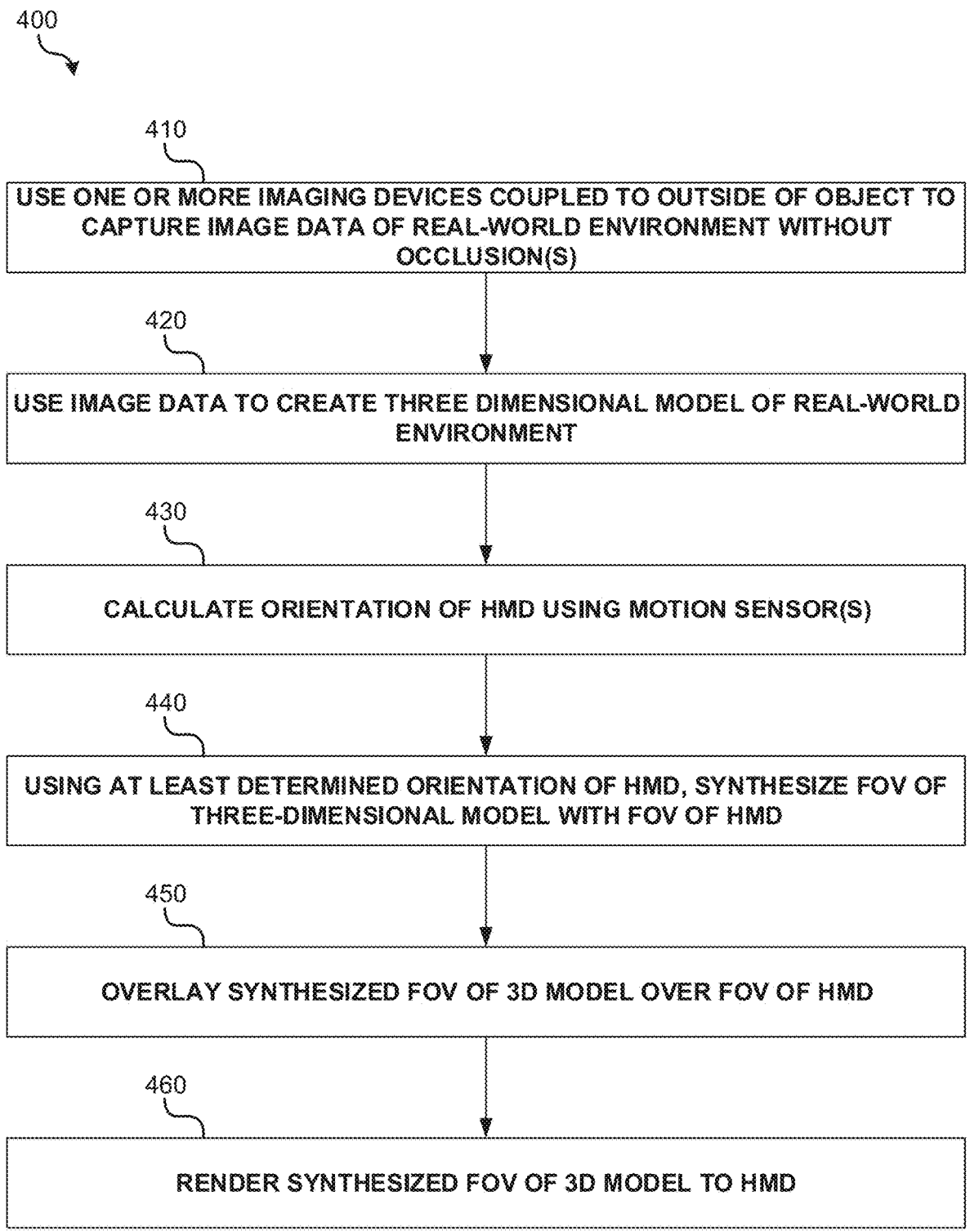

FIG. 4 is an operational flow diagram illustrating another example method that may be performed by a HMD system in communication with imaging devices to provide a see-through view of an environment through a visual obstacle, in accordance with implementations.

Figure 5A:
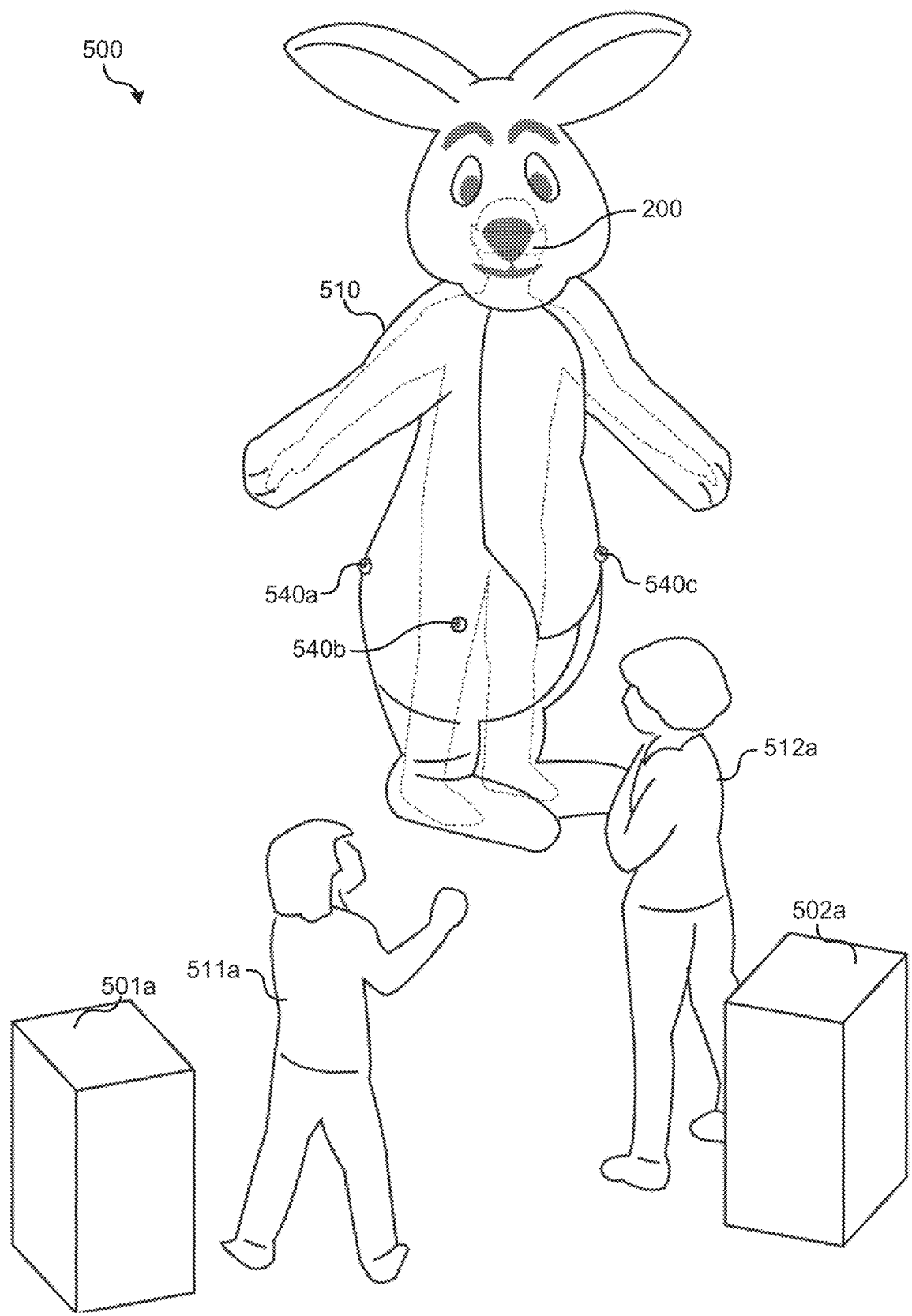

FIG. 5A illustrates another example environment in which the disclosure may be implemented.

Figure 5B:
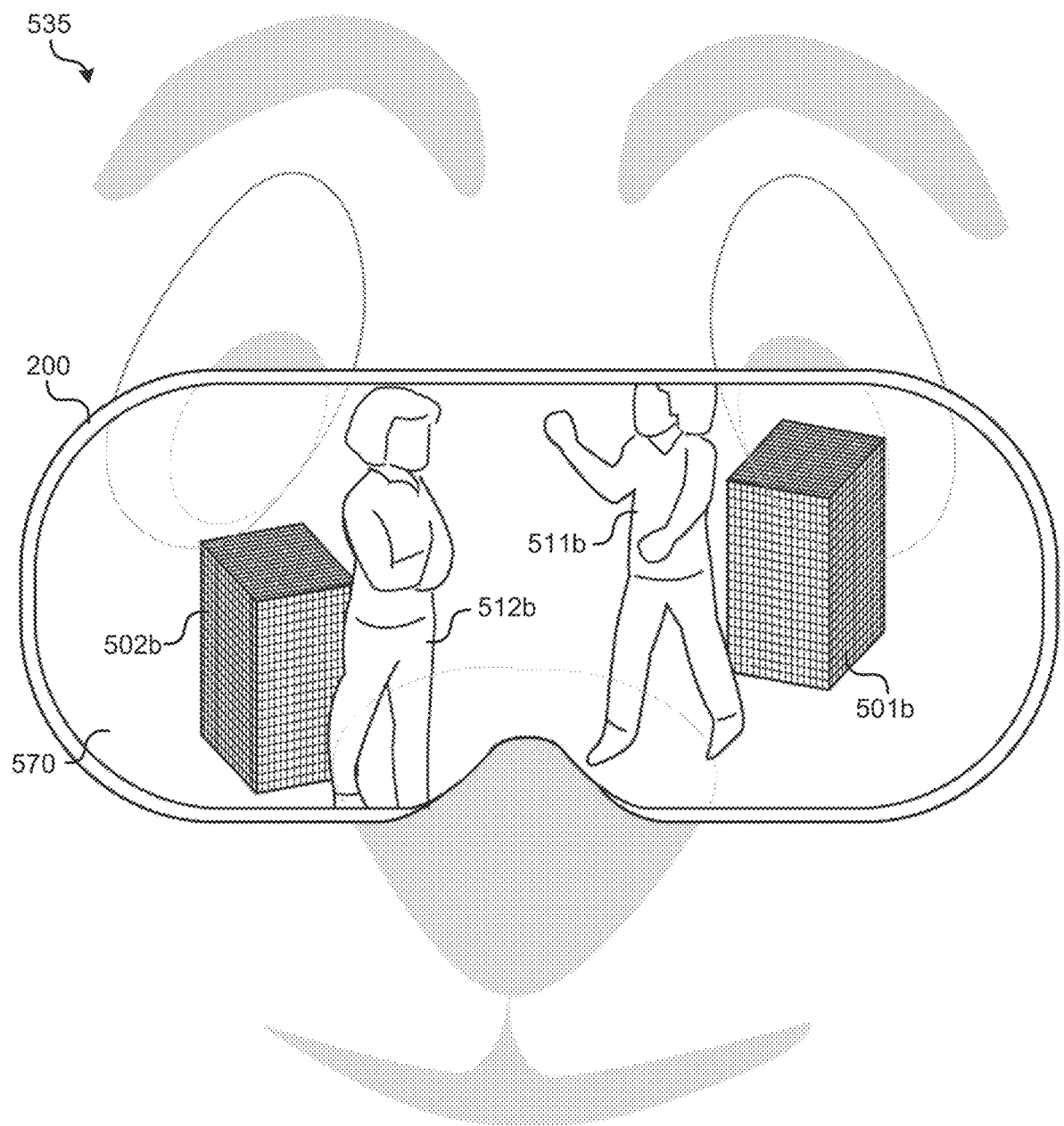

FIG. 5B illustrates an interior view of the costume of FIG. 5A, including an idealized representation of a field of view of a head mounted display in communication with omnidirectional cameras mounted on the exterior of the costume.

Figure 6:
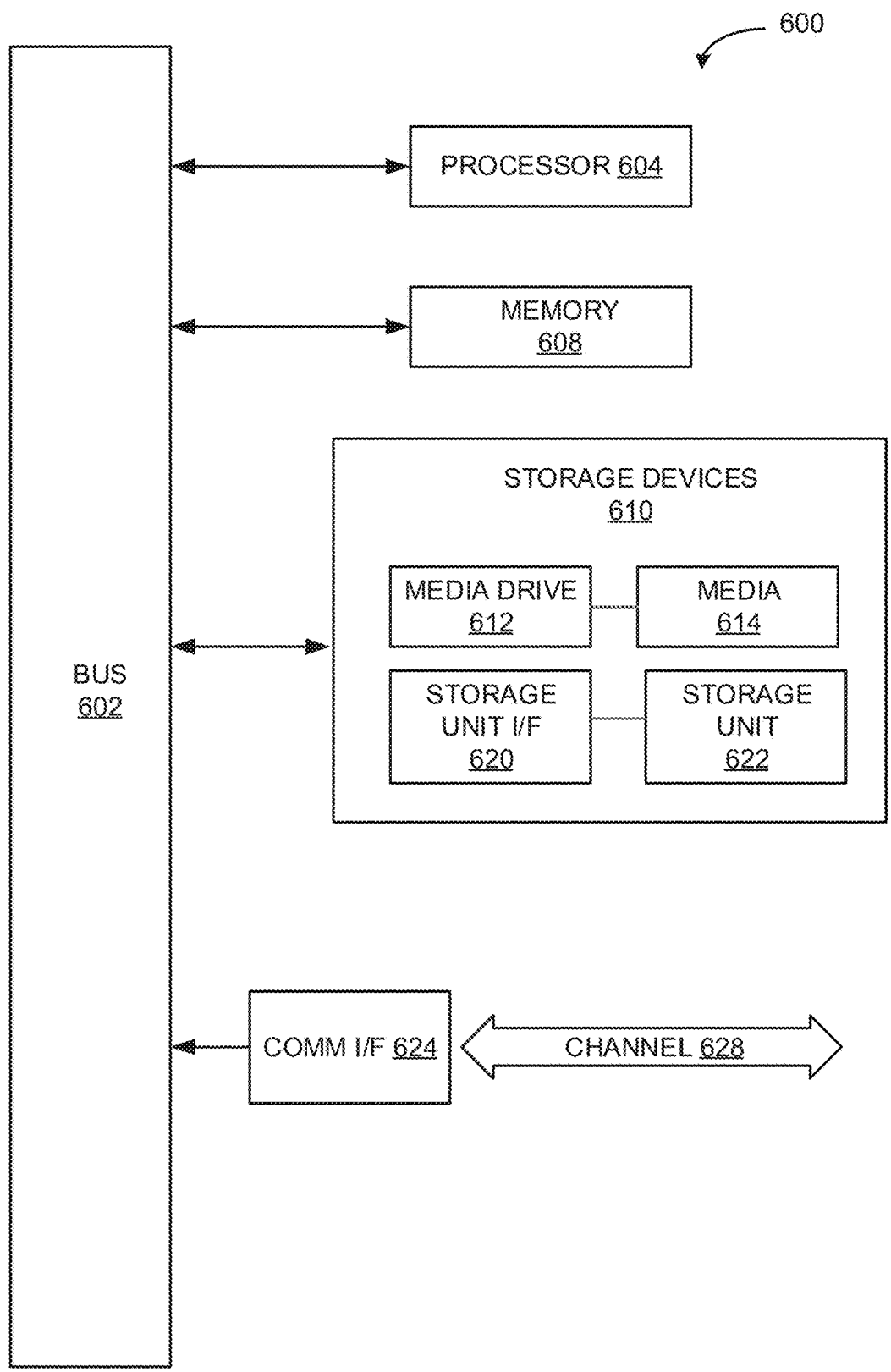

FIG. 6 illustrates an example computing module that may be used to implement various features of the methods disclosed herein.

DETAILED DESCRIPTION

The figures are not exhaustive and do not limit the disclosure to the precise form disclosed.

DETAILED DESCRIPTION

Limited operator awareness of objects in a surrounding environment is a problem that may be encountered in the film and theme park industries. For example, when filming a production with a moving camera car or hero vehicle, the vehicle operator's awareness (e.g., field of view) of the surrounding environment may be severely limited by visual obstacles or distractions such as cameras, lights, props, other employees on set, etc. In such settings, the vehicle's operator may need to rely on a small display and/or an external radio spotter to avoid colliding with nearby objects and/or people. As another example, the view of a camera operator working on a movie set may be occluded due to surrounding camera dollies, chairs, directors, actors, etc.

As a further example, performers working as costumed characters in theme parks or other settings may have limited awareness of their surrounding environment due to factors such as the small viewing openings provided by the costume, the lack of mobility due to the costume's size, and/or other impediments introduced by wearing the costume. If a performer working as a costumed character does not cautiously traverse the surrounding environment, the performer may inadvertently collide with a customer outside of the performer's field of view.

Implementations of the disclosure are directed to addressing these and other problems that may occur when an individual's awareness of their surrounding environment may be limited by one or more visual obstacles. In accordance with implementations described herein, a HMD system in communication with one or more imaging devices may be used to provide operator visibility through an object that occludes the view of the operator.

While the FOV of the HMD may be obstructed by an object, the FOV of the imaging devices may not be obstructed by the object. For example, the HMD may mounted within the object, and the imaging devices may be mounted on the object. Using this configuration, a FOV of image data captured by the one or more imaging devices may be synthesized and rendered to a FOV of the HMD. In this manner, the rendered synthesized FOV may permit the operator to "look through" objects.

Figure 1A:
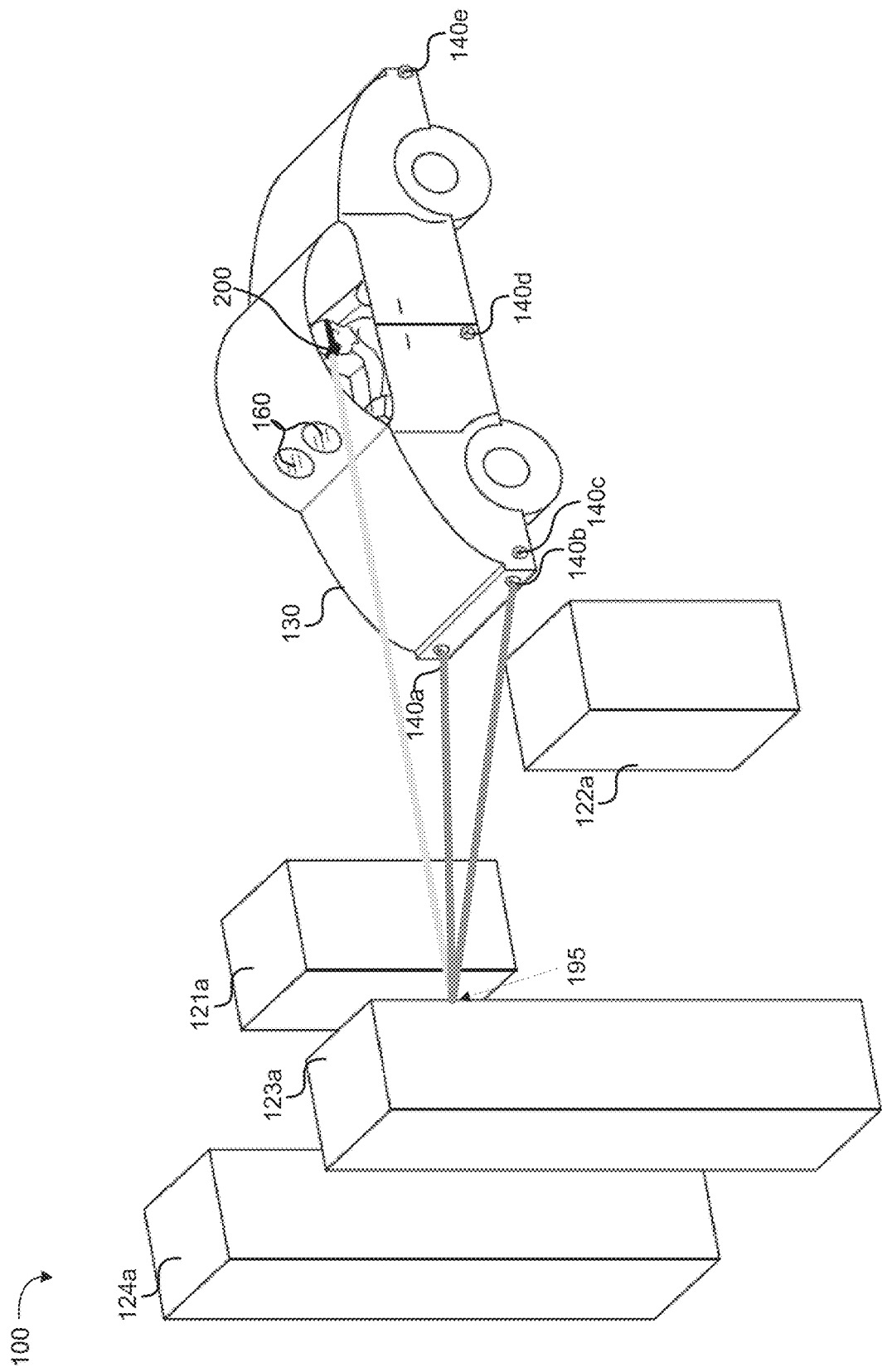
FIG. 1A illustrates an example environment in which the disclosure may be implemented.
Figure 1B:
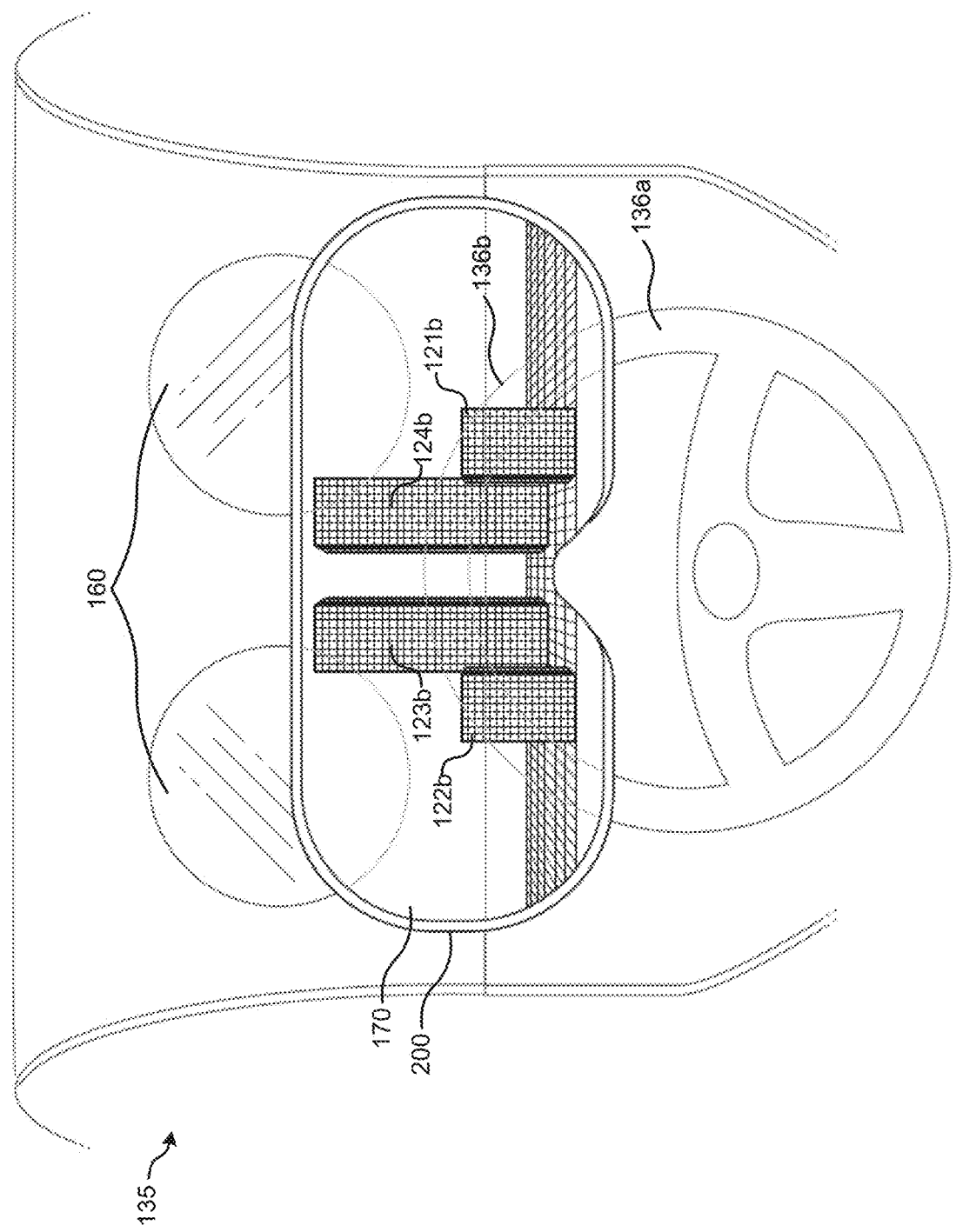
FIG. 1B illustrates an interior view of the vehicle of FIG. 1A, including an idealized representation field of view of a head mounted display in communication with omnidirectional cameras mounted on the exterior of the vehicle.

FIGS. 1A-1B illustrate one example environment 100 in which the disclosure may be implemented. In this environment, a novelty vehicle 130 (e.g., a vehicle used during film production) occludes an operator's field of view of the environment outside of vehicle 130. In particular, the novelty vehicle 130 only provides small circular windows 160 for observing oncoming obstacles, people, vehicles, or other objects 121*a*, 122*a*, 123*a*, and 124*a* that may collide with the vehicle.

To address this problem, the vehicle may be mounted with one or more imaging devices 140*a*, 140*b*, 140*c*, 140*d*, 140*e* (e.g., omnidirectional cameras), each of which captures image data associated with a respective field of view (FOV) of the environment outside of the vehicle from a respective location. The captured image data may be dynamically communicated (e.g., over a local wired or wireless network) to a HMD display system 200 including a HMD worn by the vehicle operator. Using a present orientation of the HMD, the orientation of imaging devices 140*a*, 140*b*, 140*c*, 140*d*, 140*e*, the FOV of the HMD, the FOVs of the imaging devices, and/or the relative positions of HMD display system 200 and the imaging devices, the HMD display system 200 may synthesize the FOVs captured by imaging devices 140*a-e* with a present FOV 170 of the HMD. Thereafter, the synthesized FOVs may be displayed on FOV 170 of the HMD (e.g., as an AR overlay or VR display), effectively providing the vehicle operator with the ability to "see through" the vehicle.

By way of example, point 195 illustrates a point that could be rendered as one or more pixels in a FOV of the HMD 200 but for the obstruction presented by the vehicle. In this current configuration, cameras 140*a* and 140*b* see this point within their FOV (e.g., as one pixel or multiple pixels) without any obstruction. During FOV synthesis, this point may be mapped from the FOV of the one or more cameras 140*a*, 140*b* to the FOV of the HMD. For example, consider the case where this point is rendered as a patch of multiple pixels by one of the cameras. During mapping, the patch of pixels may be scaled (e.g., based on 3D-estimation to determine depth of scene), rotated, shifted, color modified, intensity modified, etc. so that the point may be properly mapped and represented as one or more pixels on the HMD. This mapping process may be repeated for every pixel that is rendered to a present FOV of the HMD 200.

FIG. 1B illustrates an idealized representation of the synthesized FOVs of imaging devices 140*a*-140*e* displayed on a FOV 170 of a HMD system 200 within an interior portion 135 of the vehicle 130. As shown, without FOV 170, the interior of vehicle 130 provides an obstructed view through windows 160 with limited to no visibility of approaching, real-world objects 121*a*, 122*a*, 123*a*, 124*a*. With FOV 170, the vehicle operator may "see through" the interior of vehicle 130 digitized representations 121*b*, 122*b*, 123*b*, 124*b* of real-world objects 121*a*, 122*a*, 123*a*, and 124*a*. The positions of digitized representations 121*b*, 122*b*, 123*b*, and 124*b* on FOV 170 may substantially correspond to the actual positions of real-world objects 121*a*, 122*a*, 123*a*, and 124*a*.

In the illustrated example of FIG. 1B, FOV 170 overlays the displayed digitized representations 121*b*, 122*b*, 123*b*, and 124*b* over a semi-transparent or ghosted representation of the interior 135 of vehicle 130 that may be within FOV 170. For example, interior vehicle objects within FOV 170 (e.g. steering wheel 136*a*, windows 160) are shown as semi-transparent or ghosted versions (e.g., ghosted steering wheel portion 136*b*). To generate this display, the HMD of HMD system 200 may be configured with a video see-through or optical see-through display that overlays the synthesized FOV of the imaging devices over the HMD's FOV. In alternative implementations, the interior 135 of vehicle 130 may not be displayed at all within FOV 170. For example, FOV 170 may only display the synthesized FOV created from image data captured by imaging devices 140*a*-140*e*.

Figure 2:
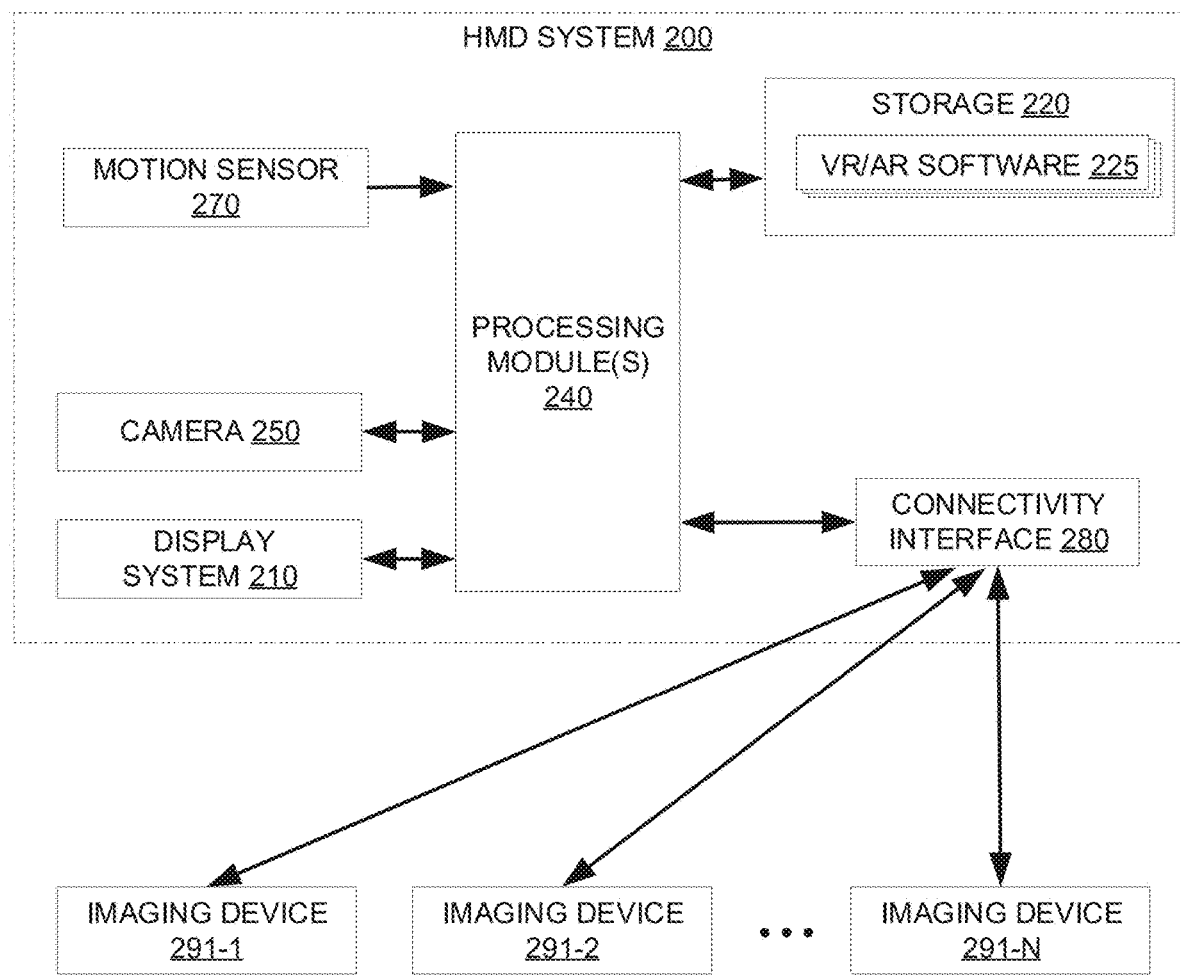
FIG. 2 is a block diagram illustrating an example architecture for components of a head-mounted display system in communication with imaging devices, in accordance with implementations of the disclosure.

FIG. 2 is a block diagram illustrating an example architecture for components of a HMD system 200 in communication with imaging devices 291-1 to 291-N (individually referred to as "imaging device 291"), that may be used to provide operator visibility through a visual obstacle, in accordance with implementations of the disclosure. HMD display system 200 may comprise any system configured to use image data collected by one or more imaging devices 291-1 to 291-N to generate and display an AR/VR view of an environment through a visual obstacle (referred to herein as a "see-through view"). For example, HMD system may generate and display an AR/VR view of an environment through a vehicle interior, a costume interior, or other object that blocks or occludes an operator's vision. The HMD system 200 may be implemented using glasses, goggles, a visor, a helmet, a head mounted smartphone, or other head-mounted device. The HMD may be tethered or untethered.

Each imaging device 291 may comprise any suitable imaging device 291 for collecting unobstructed image data of the environment that may be synthesized to a FOV of the HMD of system 200 to provide a see-through view. For example, each imaging device 291 may comprise an omnidirectional camera (e.g., omnidirectional cameras 140*a*-140*e*), a camera that is not omnidirectional, a three-dimensional scanner (e.g., a LIDAR unit that uses a laser to emit pulsed light that is reflected back to a sensor), or other suitable imaging device for imaging and/or mapping an environment surrounding an operator of HMD system 200. Each imaging device 291 may be positioned to collect unobstructed image data of the environment and/or to collect image data of the environment from all positions around an obstructing object. For example, each imaging device 291 may be mounted on an exterior of an obstructing object (e.g., exterior of vehicle, costume, etc.) or other suitable location.

HMD system 200 may include a display system 210, storage 220, processing module 240, camera 250, motion sensor 270, and connectivity interface 280.

Display 210 may be an AR display such as an optical see-through display (e.g., a transparent OLED or LED screen that uses a waveguide to display the digital objects overlaid over the real-world environment) or video see-through display that supplements video of the user's real world environment with overlaid digital objects (e.g., overlay of video captured by imaging devices 291 that is synthesized with the FOV of the HMD). Alternatively, display 210 may be implemented as a VR display.

Camera 250 may capture a video of the environment from the point of view of the wearer of the HMD system 200. For instance, in the example of environment 100, the captured video may correspond to the obstructed point of view from the interior portion 135 of the vehicle.

Motion sensor 270 generates electronic signals representative of the motion or position of AR device 200. These electronic input signals may be received and processed by circuitry of processing module 240 to determine the motion of a user of HMD system 200 and/or an absolute orientation of HMD system device 200 in the north-east-south-west (NESW) and up-down planes. In various embodiments, motion sensor 270 may comprise one or more gyroscopes, accelerometers, and magnetometers.

Storage 220 may comprise volatile memory (e.g. RAM), non-volatile memory (e.g. flash storage), or some combination thereof. In various embodiments, storage 220 stores AR/VR software 225, that when executed by processing module 240 (e.g., a digital signal processor), causes HMD system 200 to use image data collected by one or more imaging devices 291 to generate a see-through view of an environment through an obstacle (e.g., a vehicle's interior). For example, the generated see-through view may comprise a 3D representation of the environment and/or objects in the environment. As another example, the generated see-through view may comprise video of the environment that is synthesized from video captured from multiple imaging devices 291.

Execution of AR/VR software 225 may also display a graphical user interface (GUI) that permits an operator wearing HMD system 200 to modify a see-through view that is displayed to the operator. For example, the operator may include controls for adjusting a transparency of an occluding object (e.g., steering wheel of FIG. 1B) in the real-world environment over which a see-through view is overlaid, controls for switching back and forth between a see-through view and an actual view (e.g., view captured using camera 250 mounted on the HMD), controls for generating a picture-in-picture representation of both the see-through view and actual view, or other suitable controls that may present a see-through view in a user friendly manner.

Connectivity interface 280 may connect HMD system 200 to imaging devices 291-1 to 291-N using one or more suitable communication protocols. For example, connectivity interface 280 may comprise a wired interface such as an ETHERNET interface, USB interface, THUNDERBOLT interface, etc. Connectivity interface 280 may also or alternatively comprise a wireless interface such as a network interface card or some other wireless interface for connecting HMD system 200 to imaging devices 291-1 to 291-N.

Figure 3A:
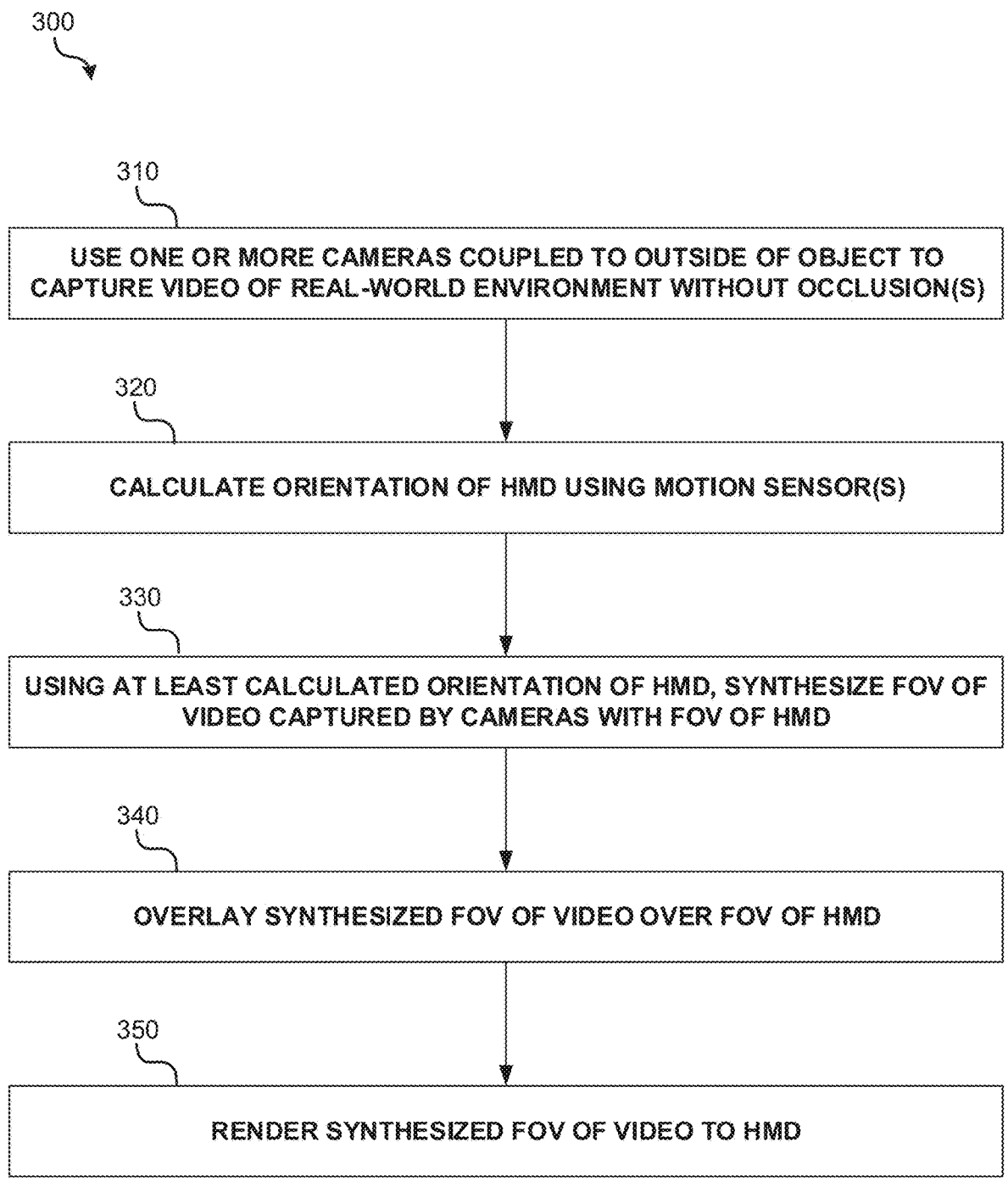
FIG. 3A is an operational flow diagram illustrating an example method that may be performed by a HMD system in communication with imaging devices to provide a see-through view of an environment through a visual obstacle, in accordance with implementations.
Figure 3B:
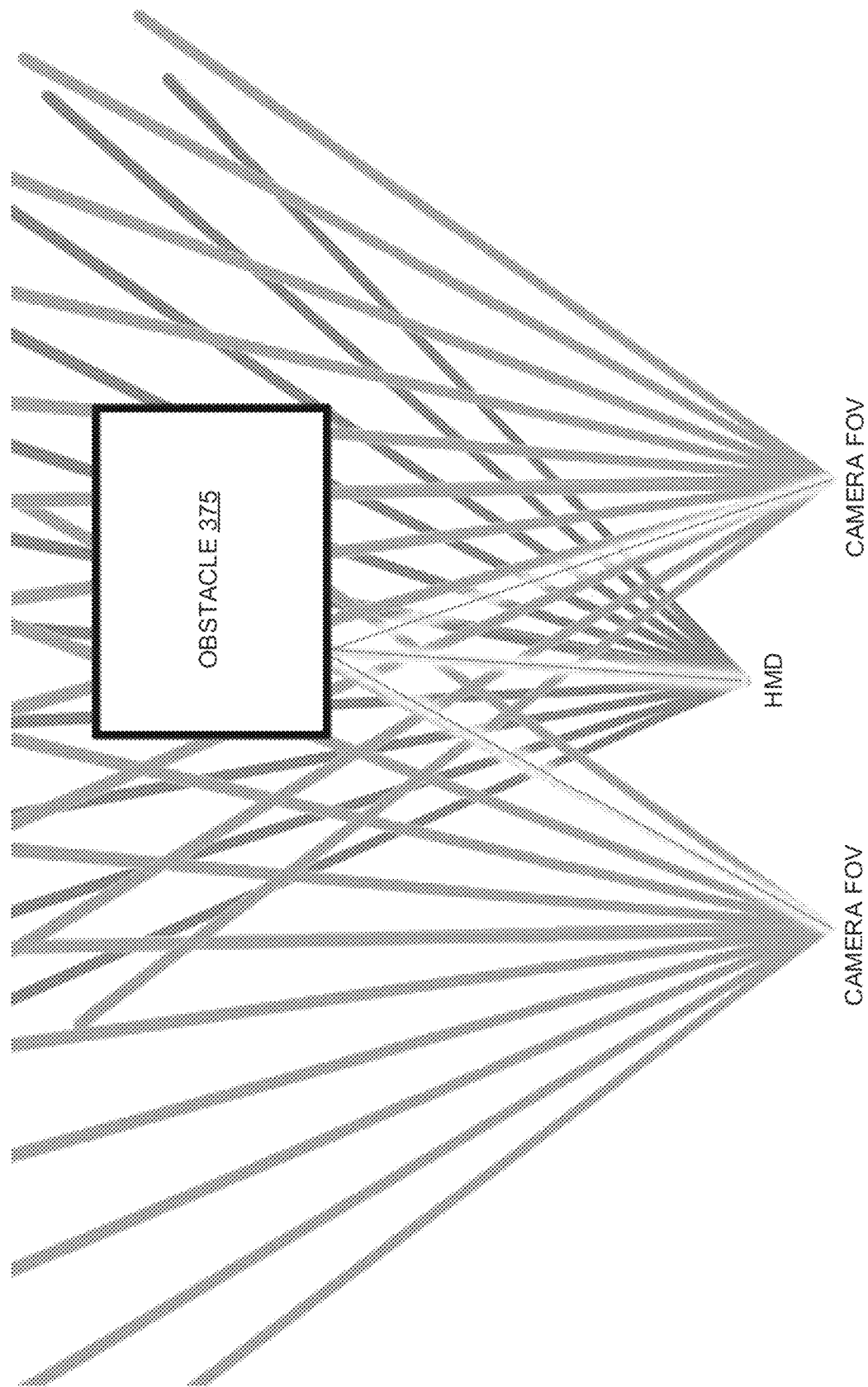

FIG. 3A is an operational flow diagram illustrating an example method 300 that may be performed by a HMD system 200 in communication with imaging devices 291 to provide a see-through view of an environment through a visual obstacle, in accordance with implementations. In the example of method 300, the see-through view shows a video of the environment, and imaging devices 291 comprise one or more cameras coupled to the outside of an object that occludes the operator's view (e.g., one or more omnidirectional cameras 140a-140e mounted to the exterior of a vehicle). Where multiple cameras are used, the cameras may be positioned and/or spaced such that they capture multiple views of the environment surrounding the object. For example, a camera may be positioned on each of the sides, front, back, and top of a vehicle.

At operation 310, one or more cameras coupled to (e.g., mounted on) the outside of the object may be used to capture video of a real-world environment without occlusion(s). In particular implementations, the one or more cameras may comprise omnidirectional cameras that capture 180 degree or 360 degree video of the environment from a particular position on the object. The object may include, for example, a vehicle, costume, camera, or other object that occludes an operator's view of the surrounding environment.

At operation 320, an orientation of a HMD of HMD system 200 may be calculated. For example one or more motion sensors 270 of a HMD system 200 may be used to track the motion of an operator's head to determine an absolute orientation of the HMD.

At operation 330, using at least the calculated orientation of the HMD, a FOV of video captured by the one or more cameras may be synthesized with an actual FOV of the HMD. For example, by taking into accounts parameters such as the absolute orientation of the HMD, the absolute orientation of the cameras (e.g., fixed in some implementations), the relative spacing between the cameras and HMD, the FOV of the cameras, and/or the FOV of the HMD, a FOV of video captured by the one or more cameras may be mapped to a FOV of the HMD to create a synthesized FOV.

By way of example, FIB. 3B conceptually illustrates a process of synthesizing a FOV of video captured by two cameras on opposite sides of a HMD with a FOV of a HMD that is partially obstructed by obstacle 375. For example, the two cameras may represent FOVs of cameras 140a-140b and the HMD FOV may represent a FOV of HMD 200. The FOVs may be synthesized for example, by interpreting what the HMD would see if it were looking at the point without obstacle 375, and which camera's pixel(s) are also looking at that point. These "intersecting pixels" could be mapped from the camera's FOV to the HMD's FOV.

In some implementations, operation 330 may comprise selecting video captured by one of several mounted cameras that has an orientation most closely corresponding to the orientation of the HMD. For example, if the operator is looking through the front of the vehicle, the video captured by a camera mounted on the front of the vehicle may be used for synchronization.

In some implementations, the one or more cameras may be mounted on an exterior of the object at approximately the same height as the HMD (e.g., the height of the HMD when the operator is seated on a vehicle, or at the height of a face portion of a costume worn by the operator) to facilitate synchronization of the camera FOV with the HMD FOV.

At operation 340, the synthesized FOV may be overlaid over a FOV captured and/or displayed by the HMD. For example, if the HMD is a video see-through HMD, the synthesized FOV may be overlaid over video captured by a camera 250 of the HMD. Alternatively, in some implementations, a FOV captured and/or displayed by the HMD may be overlaid over the synthesized FOV. In yet other implementations, operation 340 may be skipped (e.g., there is no overlay, only the synthesized FOV is prepared for rendering).

At operation 350, the synthesized FOV of the video may be rendered to the HMD. For example, as illustrated by FIG. 1B, the rendered synthesized FOV overlays the synthesized FOV over a ghosted image of the HMD's FOV.

FIG. 4 is an operational flow diagram illustrating another example method 400 that may be performed by a HMD system 200 in communication with imaging devices 291 to provide a see-through view of an environment through a visual obstacle, in accordance with implementations. In the example of method 400, the see-through view shows a 3D model of the environment.

At operation 410, one or more imaging devices coupled to (e.g., mounted on) the outside of the object may be used to capture image data of a real-world environment without occlusion(s). In some implementations the one or more imaging devices may comprise cameras (e.g., omnidirectional cameras) and the image data may comprise video. In other implementations, the one or more imaging devices may comprise 3D scanning devices such as structured-light 3D scanners, flash LIDAR, or other scanning devices (e.g., fast 3D scanning devices) that may collect image data of area that may be used to create a 3D model.

At operation 420, the captured image data may be used to create a 3D model of the real-world environment. The created 3D model may be a polygonal model, a curved model, a digitally sculpted model, or other suitable model that may be used to represent objects in the environment that that the HMD system operator should be aware of.

In implementations where a 3D model is generated from captured video, a variety of photogrammetric techniques may be used to generate the 3D model. In one implementation, video frames captured from multiple cameras may be aligned by finding common points and matching their positions. As more points are found and matched, the position at which each video frame was captured can be determined, and a sparse point cloud can be created. A dense point cloud can be generated by interpolating points on the sparse point cloud, using the video frames to add more detail. The dense point cloud can be converted into a wireframe model, and a surface can be filled in on the wireframe model, creating a mesh. In a particular implementation, a 3D model may be created by using a large-scale structure-from-motion (SfM) algorithm that recovers a triangular mesh.

Alternatively, in implementations utilizing imaging devices that are 3D scanning devices, a 3D model may be generated using a 3D point cloud created by laser pulsed-based scanning (e.g., LIDAR scanning) or other three-dimensional scanning of the location.

At operation 430, an orientation of a HMD of HMD system 200 may be calculated. For example one or more motion sensors 270 of a HMD system 200 may be used to track the motion of an operator's head to determine an absolute orientation of the HMD.

At operation 440, using at least the calculated orientation of the HMD, a FOV of created 3D model may be synthesized with an actual FOV of the HMD. For example, by taking into accounts parameters such as the absolute orientation of the HMD and the FOV of the HMD, a FOV of the model may mapped to a FOV of the HMD. For example, by interpreting what the HMD would see if it were looking at each point/pixel without obstruction, corresponding points from the 3D model may be mapped to the HMD for display.

At operation 450, the synthesized FOV of the 3D model may be overlaid over a FOV captured and/or displayed by the HMD. For example, if the HMD is a video see-through HMD, the 3D model's synthesized FOV may be overlaid over video captured by a camera 250 of the HMD. Alternatively, in some implementations, a FOV captured and/or displayed by the HMD may be overlaid over the 3D model's synthesized FOV. In yet other implementations, operation 340 may be skipped (e.g., there is no overlay, only the 3D model's synthesized FOV is prepared for rendering).

At operation 460, the 3D model's synthesized FOV of the video may be rendered to the HMD.

FIGS. 5A-5B illustrate another example environment in which the disclosure may be implemented. In this example environment, a performer dressed as a costumed character 510 wears a HMD system 200 that provides a see-through view through an interior portion 535 of the costume. HMD system 200 may be in communication with omnidirectional cameras 540a-540c mounted on the exterior of the costume. Video captured by omnidirectional cameras 540a-540c of the surrounding environment, including customers 511a-512a and objects 501a-502a, may be synthesized for display on FOV 570.

With FOV 570, the performer may see through the interior of the costume digitized representations 501b, 502b, 511b, 512b, of real-world customers 511a-512a and objects 501a-501b. The positions of digitized representations 501b, 502b, 511b, 512b on FOV 570 may substantially correspond to the actual positions of real-world customers 511a-512a and objects 501a-501b.

Although implementations of the disclosure have been described in the context of filming vehicles and costumed characters, it should be appreciated that the systems and methods described herein may be implemented in other environments. For example systems and methods described herein may be implemented to provide enhanced security an environments where objects and/or walls obstruct an individual's view of a particular location. As another example, systems and methods described herein may be implemented in busy filming environments including dozens of other operators and/or filming equipment.

FIG. 6 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD, DVD, or Blu-ray, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 608, storage unit 622, and media 614. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment.

Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
    capturing first image data of a real-world environment at a first location via a first imaging device and second image data at a second location different than the first location via a second imaging device different than the first imaging device, wherein the first imaging device and the second imaging device are movable together with a user based on a user movement, and wherein the first image data and the second image data includes a plurality of intersecting image data points captured at both the first location and the second location, and a representation of an area in the real world occluded by an obstacle from a point of view of the user;
    generating a synthesized field of view ("FOV") that includes the plurality of intersecting image data points such that the synthesized FOV includes an unobstructed view of the area in the real world occluded by the obstacle from the point of view of the user, wherein the unobstructed view is mapped into the synthesized FOV as a patch including the plurality of intersecting image data points included in both the first image data captured at the first location and the second image data captured at the second location;
    overlaying the synthesized FOV with video data corresponding to the point of view of the user; and
    rendering the synthesized FOV as a visual display.

2. The method of claim 1, wherein the first location is on a first side of the user and the second location is on a second side of the user.

3. The method of claim 1, wherein the synthesized FOV is rendered on a head mounted display configured to be worn by the user.

4. The method of claim 1, wherein the obstacle comprises a portion of a costume worn by the user and the representation of the area occluded by the obstacle comprises a view of the real-world environment outside the costume.

5. The method of claim 1, further comprising generating a three-dimensional model of the real-world environment based, at least in part, on the image data.

6. The method of claim 5, wherein generating the three-dimensional model comprises correlating a first position of one or more image data points of the plurality of intersecting image data points captured at the first location with a second position of one or more image data points of the plurality of intersecting image data points captured at the second location.

7. The method of claim 5, wherein the image data includes depth data and the three-dimensional model is based at least in part on the depth data.

8. The method of claim 1, further comprising calculating a spatial relationship between the first location, the second location, and the user, wherein the synthesized FOV is based, at least in part, on the spatial relationship.

9. A non-transitory computer-readable medium having executable instructions stored thereon that, when executed by a processor, cause the processor to:
- capture first image data of a real-world environment at a first location via a first imaging device and second image data at a second location different than the first location via a second imaging device different than the first imaging device, wherein the first imaging device and the second imaging device are movable together with a user based on a user movement, and wherein the first image data and the second image data includes a plurality of intersecting image data points captured at both the first location and the second location, and a representation of an area occluded by an obstacle from a point of view of a user;
- generate a synthesized field of view ("FOV") that includes the plurality of intersecting image data points such that the synthesized FOV includes an unobstructed view of the area occluded by the obstacle from the point of view of the user, wherein the unobstructed view is mapped into the synthesized FOV as a patch including the plurality of intersecting image data points included in both the first image data captured at the first location and the second image data captured at the second location;
- overlay the synthesized FOV with video data corresponding to the point of view of the user; and
- render the synthesized FOV as a visual display.

10. The non-transitory computer-readable medium of claim 9, wherein the first location is on a first side of the user and the second location is on a second side of the user.

11. The non-transitory computer-readable medium of claim 9, wherein the synthesized FOV is rendered on a head mounted display configured to be worn by the user.

12. The non-transitory computer-readable medium of claim 9, wherein the obstacle comprises a portion of a costume worn by the user and the representation of the area occluded by the obstacle comprises a view of the real-world environment outside the costume.

13. The non-transitory computer-readable medium of claim 9, wherein executable instructions further cause the processor to generate a three-dimensional model of the real-world environment based, at least in part, on the image data.

14. The non-transitory computer-readable medium of claim 9, wherein executable instructions further cause the processor to calculate a spatial relationship between the first location, the second location, and the user, wherein the synthesized FOV is based, at least in part, on the spatial relationship.

15. A visual display system, comprising:
- a display;
- a first imaging device; and
- a second imaging device different than the first imaging device,
- a processor in communication with the display and configured to:
  - receive first image data of a real-world environment captured at a first location via the first imaging device and second image data at a second location different than the first location via the second imaging device, wherein the first imaging device and the second imaging device are movable together with a user based on a user movement, and wherein the first image data and the second image data includes a plurality of intersecting image data points captured at both the first location and the second location, and a representation of an area occluded by an obstacle from a point of view of a user;
  - generate a synthesized field of view ("FOV") that includes the plurality of intersecting image data points such that the synthesized FOV includes an unobstructed view of the area occluded by the obstacle from the point of view of the user, wherein the unobstructed view is mapped into the synthesized FOV as a patch including the plurality of intersecting image data points included in both the first image data captured at the first location and the second image data captured at the second location;
  - overlay the synthesized FOV with video data corresponding to the point of view of the user; and
  - render the synthesized FOV on the display.

16. The method of claim 1, wherein the image data comprises video data.

17. The method of claim 1, wherein the first imaging device and the second imaging device comprise omnidirectional cameras.

18. The method of claim 1, wherein the first imaging device and the second imaging device are coupled to a costume configured to be worn by the user.

19. The visual display system of claim 15, further comprising:
- a costume configured to be worn by the user, wherein the first imaging device and the second imaging device are coupled to an exterior portion of the costume.

* * * * *